US009752893B2

(12) United States Patent
Mohideen et al.

(10) Patent No.: US 9,752,893 B2
(45) Date of Patent: *Sep. 5, 2017

(54) ONBOARD AIRCRAFT SYSTEMS AND METHODS TO IDENTIFY MOVING LANDING PLATFORMS

(71) Applicant: HONEYWELL INTERNATIONAL INC., Morristown, NJ (US)

(72) Inventors: Mohammed Ibrahim Mohideen, Karnataka (IN); Anoop S, Karnataka (IN); Alpana Priyamvada, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/813,957

(22) Filed: Jul. 30, 2015

(65) Prior Publication Data

US 2017/0030735 A1  Feb. 2, 2017

(51) Int. Cl.
    *G01C 23/00*  (2006.01)
    *G08G 5/00*  (2006.01)
    (Continued)

(52) U.S. Cl.
    CPC ........... *G01C 23/005* (2013.01); *B64D 45/04* (2013.01); *G05D 1/0684* (2013.01); *G08G 5/0021* (2013.01); *G08G 5/025* (2013.01)

(58) Field of Classification Search
    CPC .... G08G 5/0021; G08G 5/0086; B64D 45/00; B64D 2700/62271; G01C 23/00; G01C 5/005; G01S 13/882; G01S 13/94
    (Continued)

(56) References Cited

U.S. PATENT DOCUMENTS

| 5,687,930 A | 11/1997 | Wagner et al. |
| 6,079,668 A | 6/2000 | Brown |

(Continued)

FOREIGN PATENT DOCUMENTS

| DE | 102008022838 | * 11/2009 |
| DE | 102008022838 A1 | 11/2009 |

(Continued)

OTHER PUBLICATIONS

Tsuda, H. et al,; "Flight Tests with Enhanced/Synthetic Vision System for Rescue Helicopter" 2011.

(Continued)

*Primary Examiner* — Joseph Feild
*Assistant Examiner* — Omar Casillashernandez
(74) *Attorney, Agent, or Firm* — Lorenz & Kopf, LLP (57) ABSTRACT

A display system for an aircraft includes a sensor configured to capture data associated with a landing platform on a movable carrier. The data includes current energy parameters of the movable carrier. The display system further includes a processing unit configured to receive the data representative of the landing platform. The processing unit is further configured to generate display commands associated with the landing platform. The display system further includes a display device coupled the processing unit for receiving the display commands and operable to render first symbology representing the landing platform.

17 Claims, 6 Drawing Sheets

(51) Int. Cl.
*B64D 45/04* (2006.01)
*G08G 5/02* (2006.01)
*G05D 1/06* (2006.01)

(58) Field of Classification Search
USPC .......................................... 340/971–977, 983
See application file for complete search history.

(56) References Cited

U.S. PATENT DOCUMENTS

| | | | |
|---|---|---|---|
| 8,019,490 | B2 | 9/2011 | Ferren et al. |
| 8,515,658 | B1* | 8/2013 | Foster .................. G01C 23/005 340/945 |
| 8,608,107 | B2 | 12/2013 | Martensson et al. |
| 2008/0198157 | A1 | 8/2008 | Feyereisen et al. |
| 2010/0023189 | A1 | 1/2010 | Suddreth et al. |
| 2012/0158222 | A1* | 6/2012 | Ehlin .................... G01S 17/023 701/16 |
| 2014/0081484 | A1 | 3/2014 | Covington et al. |
| 2014/0207315 | A1* | 7/2014 | He ....................... G01C 23/005 701/16 |
| 2014/0338441 | A1* | 11/2014 | Sutherland .............. B63B 27/36 73/170.31 |
| 2014/0379179 | A1* | 12/2014 | Goossen .................. G08G 5/02 701/18 |
| 2015/0032299 | A1* | 1/2015 | Puyou .................. G05D 1/0676 701/16 |
| 2016/0133138 | A1* | 5/2016 | Oldach .................. G08G 5/025 701/16 |
| 2016/0252351 | A1* | 9/2016 | Feldmann .............. G01C 21/00 |

FOREIGN PATENT DOCUMENTS

| | | |
|---|---|---|
| WO | 2010020751 A3 | 2/2010 |
| WO | 2014169353 A1 | 10/2014 |

OTHER PUBLICATIONS

Hans-Ullrich Döhler et al,; "All Flight," A full scale enhanced and synthetic vision sensor suite for helicopter applications, 2009.
Devendran B. et al..; "Modeling specifications for HiVision Millimeter Wave Radar for multisensory Enhanced Vision Systems," EVS, 2013.
R. Randall Padfield,; "Synthetic Vision with Infrared Becomes Helicopter's SmartView," Jun. 2, 2013.
Ford T. et al.,; "Helicopter Ship Board Landing System" Boeing Co. & NovAtel Inc., Sep. 2001-2004.
Chaves S. etal,; "Toward GPS-denied landing of unmanned aerial vehicles on ships at sea" NEEC research, Nov. 2004.
Truskin B. L. et al..; "Vision-based Deck State Estimation for Autonomous Ship-board Landing" Aerospace Engineering,The Pennsylvania State University, Aerospace Department University Park, PA, U.S.A., May 21-23, 2013.
Extended EP Search Report for Application No. 16181336.5-1803/ 3125213 dated Jan. 3, 2017.

* cited by examiner

ONBOARD AIRCRAFT SYSTEMS AND METHODS TO IDENTIFY MOVING LANDING PLATFORMS

TECHNICAL FIELD

The present invention generally relates to aircraft display systems and methods, and more particularly, to systems and methods for enhanced identification and display of landing information.

BACKGROUND

Computer generated aircraft displays have become highly sophisticated and are used as primary flight displays to provide flight crews with real-time visual representations of flight management, navigation, and control information during flight in a single, readily interpretable display. As a result, such displays have become effective visual tools for controlling aircraft, reducing pilot workload, increasing situational awareness, and improving overall flight safety.

Landing is typically the most demanding aspect of flight. The landing operation is particularly difficult during low visibility or nighttime conditions. The landing operation may be further complicated when the landing platform is moving, such as is common when an aircraft lands on a ship. Although conventional display systems provide various types of information about the landing environment, it may be necessary for the pilot during the landing operation to mentally consider and adjust for the relative motion of the landing platform.

Accordingly, it is desirable to provide systems and methods with additional and/or more convenient flight information on an aircraft visual display, particularly during a landing operation. Furthermore, other desirable features and characteristics of the present invention will become apparent from the subsequent detailed description of the invention and the appended claims, taken in conjunction with the accompanying drawings and this background of the invention.

BRIEF SUMMARY

A display system for an aircraft includes a sensor configured to capture data associated with a landing platform on a movable carrier. The data includes current energy parameters of the movable carrier. The display system further includes a processing unit configured to receive the data representative of the landing platform. The processing unit is further configured to generate display commands associated with the landing platform. The display system further includes a display device coupled the processing unit for receiving the display commands and operable to render first symbology representing the landing platform.

A method is provided for displaying a landing platform on a movable carrier. The method includes capturing data associated with the landing platform on the movable carrier with a sensor, the data including current energy parameters of the movable carrier; generating display commands associated with the landing platform; and rendering first symbology representing the landing platform on a display device based on the display commands.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments described herein provide visual display systems and methods for aircraft. More specifically, the display systems and methods provide additional and/or more convenient landing information superimposed with other navigation and control information when approaching a landing platform, particularly a movable platform. In one exemplary embodiment, the characteristics of the movable platform may be identified with onboard sensors, e.g., sensors that are typically associated with an enhanced vision system. The symbology presented to the operator may include symbology associated with the movement of the landing platform.

Figure 1:
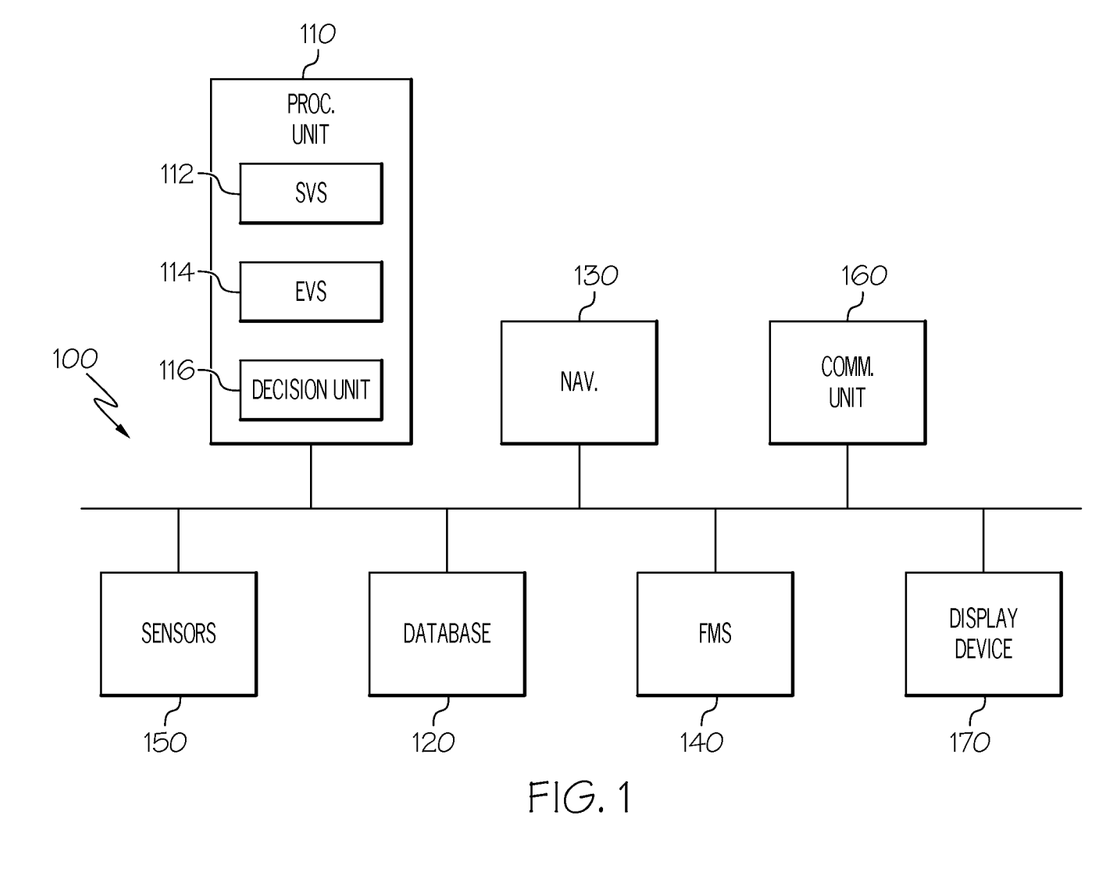
FIG. 1 is a functional block diagram of an aircraft display system in accordance with an exemplary embodiment.

FIG. 1 is a block diagram of an aircraft display system 100 in accordance with an exemplary embodiment. It should be understood that FIG. 1 is a simplified representation of the system 100 for purposes of explanation and ease of description. Further exemplary embodiments of the system 100 may include additional, other devices and components for providing further functions and features. As described below, the system 100 is typically utilized during flight to enhance the type and/or visibility of pertinent information for a user (e.g., a pilot or flight crew) during a landing situation. The system 100 can be utilized in an aircraft, such as a helicopter, airplane, or unmanned vehicle. Moreover, exemplary embodiments of the system 100 can also be utilized in spacecraft, ships, submarines, and other types of vehicles. For simplicity, exemplary implementations are described below with reference to "aircraft."

In one exemplary embodiment, the system 100 is particularly useful during a landing operation in which the aircraft is approaching a landing platform that may be moving. For example, landing platforms on ships or other types of carriers may be moving in one or more horizontal directions, but also subject to changes in pitch, roll, yaw, and elevation (e.g., changes in the vertical direction). Although such landing platforms are typically associated with ships, the exemplary embodiments discussed below are applicable to any type of land, water, or air landing platforms that are moving or movable relative to a fixed location. In the discussion below, the term "landing platform" refers to any type of landing location (e.g., a landing pad or runway), and the term "carrier" refers to any type of base or structure (e.g., a ship, vessel, and/or air or land platform) associated with the landing platform.

As shown in FIG. 1, the system 100 includes a processing unit 110, a database 120, a navigation system 130, a flight management system 140, sensors 150, a communications unit 160, and a display device 170 coupled together in any suitable manner, such with as a data bus. Although the system 100 appears in FIG. 1 to be arranged as an integrated system, the system 100 is not so limited and can also include an arrangement whereby one or more aspects of the system 100 are separate components or subcomponents of another system located either onboard or external to the aircraft. Each component is introduced below prior to a more detailed description of particular features of the system 100 described in conjunction with FIGS. 2-6.

The processing unit 110 may be a computer processor associated with a primary flight display or other aircraft display. In one exemplary embodiment, the processing unit 110 functions to at least receive and/or retrieve aircraft flight management information (e.g., from the flight management system 140), navigation and control information (e.g., from the navigation system 130), and landing, target and/or terrain information (e.g., from the database 120, sensors 150, and/or communications unit 160). As introduced above and discussed in further detail below, the processing unit 110 additionally calculates and generates display commands representing the flight environment, particularly the landing environment. The processing unit 110 may function as a graphics display generator to generate display commands based on algorithms or other machine instructions stored in the processing unit 110 or in separate memory components. The processing unit 110 then sends the generated display commands to display device 170 for presentation to the user. More specific functions of the processing unit 102 will also be discussed below.

In some embodiments, the processing unit 110 of the system 100 may include or be integrated with a synthetic vision system (SVS) 112, an enhanced vision system (EVS) (or enhanced flight vision system (EFVS)) 114, or a combined vision system. In the embodiment shown in FIG. 1, the processing unit 110 includes an SVS 112, an EVS 114, and a decision unit 116. Generally, the SVS 112 is configured to receive flight management and position information (e.g., from the navigation system 130 and flight management system 140) and terrain information (typically from database 120) to generate a three-dimensional image that shows the topographical environment through which the aircraft is flying from the perspective of a person sitting in the cockpit of the aircraft. Generally, the EVS 114 receives flight management and position information (e.g., from the navigation system 130 and flight management system 140) and terrain information (typically from sensors 150) to form an image that is then displayed to the pilot. In the embodiment of FIG. 1, the system 100 displays images from the SVS 112 and the EVS 114 on the same display screen (e.g., display device 170). In particular, the decision unit 116 is configured to correlate or register the images from the SVS 112 and EVS 114, determine how to combine the images, and facilitate display of the resulting image. In one exemplary embodiment, the decision unit 116 functions to overlay an image from the EVS 114 on top of the image from the SVS 112 with additional flight management and control symbology. In some exemplary embodiments, the SVS 112 and/or EVS 114 may be omitted. In other embodiments, the EVS 114 may be used to modify or improve the synthetic image generated by the SVS 112. Additional details about the processing unit 110, including the SVS 112, EVS 114, and decision unit 116, will also be discussed below.

Depending on the embodiment, the processing unit 110 may be implemented or realized with a general purpose processor, a content addressable memory, a digital signal processor, an application specific integrated circuit, a field programmable gate array, suitable programmable logic device, discrete gate or transistor logic, processing core, discrete hardware components, or any combination thereof. In practice, the processing unit 110 includes processing logic that may be configured to carry out the functions, techniques, and processing tasks or methods associated with operation of the system 100.

Although not shown, the processing unit 110 may include a user interface coupled to the processing unit 110 to allow a user to interact with the display device 170 and/or other elements of the system 100. The user interface may be realized as a keypad, touchpad, keyboard, mouse, touch panel, joystick, knob, line select key or another suitable device adapted to receive input from a user. In some embodiments, the user interface may be incorporated into the display device 170, such as a touchscreen. In further embodiments, the user interface is realized as audio input and output devices, such as a speaker, microphone, audio transducer, audio sensor, or the like.

Database 120 is coupled to processing unit 110 and can be a memory device (e.g., non-volatile memory, disk, drive, tape, optical storage device, mass storage device, etc.) that stores digital landing, waypoint, target location, and terrain data as either absolute coordinate data or as a function of aircraft position that enables the construction of a synthetic or enhanced representation of the aircraft operating environment. Database 120 can additionally include other types of navigation and/or operational information relating to the evaluation and display of landing information. For example, database 120 may include safety margins or parameters that provide guidance for evaluating a flight situation, such as during a landing situation. In some embodiments, database 120 includes data associated with landing platform and the corresponding carriers, as described in greater detail below. Data in the database 120 may be uploaded prior to flight or received from external sources during flight. In one exemplary embodiment, landing information is collected by sensors onboard the aircraft, e.g., sensors 150, described below.

The navigation system 130 is configured to provide the processing unit 110 with real-time navigational data and/or information regarding operation of the aircraft. The navigation system 130 may include or cooperate with a global positioning system (GPS), inertial reference system (IRS), Air-data Heading Reference System (AHRS), or a radio-based navigation system (e.g., VHF omni-directional radio range (VOR) or long range aid to navigation (LORAN)). The navigation system 130 is capable of obtaining and/or determining the current state of the aircraft, including the location (e.g., latitude and longitude), altitude or above ground level, airspeed, pitch, glide scope, heading, and other relevant flight information.

The flight management system 140 supports navigation, flight planning, and other aircraft control functions, as well as provides real-time data and/or information regarding the operational status of the aircraft. The flight management system 140 may include or otherwise access one or more of the following: a weather system, an air traffic management system, a radar system, a traffic avoidance system, an autopilot system, an auto-thrust system, a flight control system, hydraulics systems, pneumatics systems, environmental systems, electrical systems, engine systems, trim systems, lighting systems, crew alerting systems, electronic checklist systems, an electronic flight bag, and/or other suitable avionics systems. As examples, the flight management system 140 may identify operating states of the aircraft, such as engine operation and current aircraft configuration status, including information regarding the current flap configuration, aircraft speed, aircraft pitch, aircraft yaw, aircraft roll, and the like. Additionally, the flight management system 140 may identify or otherwise determine environmental conditions at or near the current location of the aircraft, such as, for example, the current temperature, wind speed, wind direction, atmospheric pressure, and turbulence. The flight management system 140 may also identify optimized speeds, distance remaining, time remaining, cross track deviation, navigational performance parameters, and other travel parameters.

The system 100 may include or otherwise receive information from one or more sensors 150. In one exemplary embodiment, the sensors 150 may include sensors configured to detect a light signature originating from outside the aircraft, such as a visible low light television camera, an infrared camera, and millimeter wave (MMW) camera or any other light sensing device capable of capturing an image or otherwise detecting light either within or outside of the visible spectrum. Other sensors 150 may include, as examples, radar, lidar, sonar, and/or weather sensors that may provide information the system 100. In some embodiments, the sensors 150 may be incorporated into the navigation system 130 and/or flight management system 140. As described below, the sensors 150 may particularly function to collect information about the identity, position, and nature of a moving landing platform relative to current aircraft position, e.g., for the EVS 114 of the processing unit 110.

The communications unit 160 may be any suitable device for sending and receiving information to and from the system 100. In some embodiments, communications unit 160 may be configured to receive radio frequency transmissions, satellite communication transmissions, optical transmissions, laser light transmissions, sonic transmissions or transmissions of any other wireless form of data link.

The system 100 also includes the display device 170 coupled to the processing unit 110. The display device 170 may include any device or apparatus suitable for displaying various types of computer generated symbols and flight information discussed above. Using data retrieved (or received) from the navigation system 130, flight management system 140, database 120, sensors 150, and/or communications unit 160, the processing unit 110 executes one or more algorithms (e.g., implemented in software) for determining the position of the various types of desired information on the display device 170. As noted above, the processing unit 110 then generates display commands representing this data, and sends display commands to the display device 170.

In various exemplary embodiments, the rendered image may be a two-dimensional lateral view, a two-dimensional vertical profile view, or a three-dimensional perspective view. Any suitable type of display medium capable of visually presenting multi-colored or monochrome flight information for a pilot or other flight crew member can be provided, such as, for example, various types of CRT displays, LCDs, OLED displays, plasma displays, projection displays, HDDs, HUDs, and the like.

Accordingly, the system 100 functions to present an image or display to the user on the display device 170 that represents the environment surrounding the aircraft as well as various types of navigation and control information. As described below, the system 100 is particularly suitable for providing information to the user during a landing operation, including information associated with the landing platform and/or the respective carrier. During operation, the landing platform on which the user intends to land may be selected by the user (e.g., via the user interface) or derived from a flight plan (e.g., via the navigation system 130 or flight management system 140). In particular, the processing unit 110 generates display commands for the display device 170 to render landing symbology associated with the landing platform of the carrier that represents the real-life appearance of the target landing platform. In one exemplary embodiment, the landing environment may be a synthetic image generated by the SVS 112 with enhanced portions generated by the EVS 114. As an example, the EVS 114 may provide symbology in the form of an image of the platform that may overlay or replace a corresponding portion of the image generated by the SVS 114. Further, the landing symbology may represent the energy parameters of the landing platform and carrier, as also described below. In some instances, the processing unit 110 may evaluate the energy parameters in view of safety margins (e.g., from the database 120) and generate an alert when one or more of the energy parameters exceed the safety margins. As such, the system 100 considers the energy parameters from the moving or movable landing platform and aligns or otherwise evaluates these energy parameters with respect to the aircraft, including aircraft energy parameters, to result in symbology that assists the operator during landing. Exemplary displays or images rendered by the system 100 upon approaching the target landing platform are described in greater detail below.

FIGS. 2-5 are visual displays or portions of displays 200, 400 rendered by the system 100 on the display device 170 in accordance with exemplary embodiments. FIG. 1 may be referenced below in the discussion of FIGS. 2-5. Generally, the visual displays or portions of displays 200, 400 include includes exemplary textual, graphical, and/or iconic information rendered by the display device 170 in response to appropriate display commands from the processing unit 110, as described above. Although various examples of symbology are described below and depicted in FIGS. 2-5, other types and variations of symbology may be presented.

Figure 2:
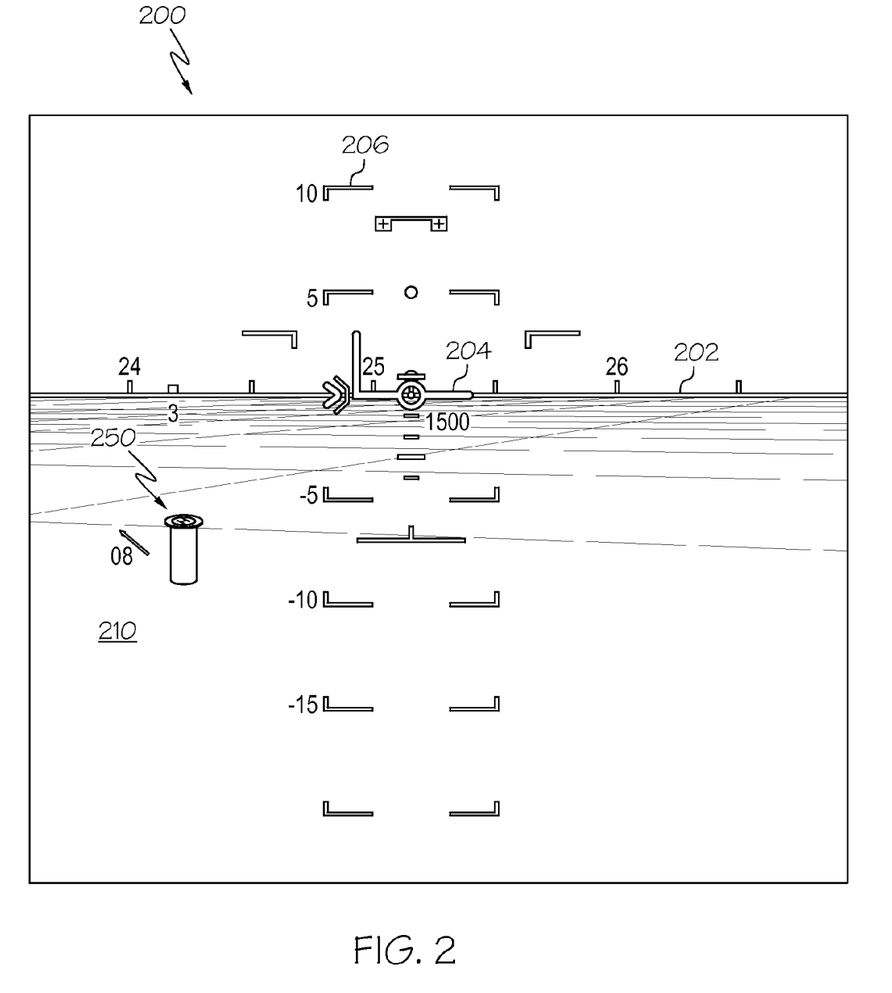
FIG. 2 is a visual display rendered by the aircraft display system of FIG. 1 in accordance with an exemplary embodiment.

As shown, FIG. 2 depicts an exemplary visual display 200 in the form of a three-dimensional synthetic perspective view of the real-time aircraft operating environment of the type presented on a primary flight display. In the depicted exemplary embodiment, the display 200 shows, among other things, computer generated symbols representing a zero pitch reference line (e.g., commonly referred to as a horizon line) 202, a flight path marker (also known as a flight path vector or velocity vector) 204, attitude indicator 206, and terrain (e.g., identified generally as element 210). Generally, the terrain 210 can include any representation of the environment surrounding the aircraft, including other aircraft or ships. Additional information may be provided on the display 200, including additional or alternative indicators representing heading, airspeed, altitude, bank angles, vertical speed, throttle, and flap and gear positions. Although the display 200 is shown as an egocentric, first-person frame of reference, the display 200 can be a secondary, wingman, and/or plan or perspective view that enables a viewer to view the aircraft, as well as zoom in and out.

In the situation depicted on the visual display 200 of FIG. 2, the aircraft is flying over water and intends to land on a landing platform of a carrier. Since the carrier may be moving, the intended landing platform may also be subject to movement. As will now be described in more detail, the display 200 also selectively renders landing information 250 that increases the situational awareness of the operator when landing on a moving landing platform.

As noted above, the landing information 250 is generally associated with a target or intended landing platform on a carrier. In some embodiments, the size of symbology representing the landing information 250 may be a function of the distance of the target platform from the aircraft. For example, at least portions of the landing information 250 represent the actual appearance of the landing platform, such as in a manner proportional to the actual size relative to the other aspects of the landing environment. However, in some scenarios, the landing information 250 may be presented in a scale that is larger than an actual representation of the landing platform. In other words, at relatively large distances, the landing information 250 is depicted with an exaggerated scale. As such, the landing information 250 may be rendered on the visual display 200 in a size that enables the user to suitably evaluate the information. Further, the landing information 250 can be modified as the aircraft approaches such that the symbology representing real life aspects of the landing platform is gradually reduced until reaching a 1:1 scale with the surrounding environment. In the view of FIG. 2, the aircraft is at a distance from the carrier such that the landing information 250 obscures any visual depiction of the carrier, which in this scenario is a ship. At a closer distance, the carrier is depicted on the visual display 200 in a form representative of the actual appearance of the carrier, similar to other portions of the environment.

As shown, FIG. 2 depicts an exemplary visual display 200 in the form of a three-dimensional perspective view of the real-time aircraft operating environment of the type presented on a primary flight display. As described above, the position and appearance of the images and other symbology on the visual display 200 may be dynamically generated by the processing unit 110 based on input from the database 120, navigation system 130, flight management system 140, sensors 150, and/or communications unit 160. In the example of FIG. 2, the display 200 is primarily a synthetic image generated by the SVS 112 with a sensor (or video) image generated by the EVS 114 selectively displayed in front of and covering a synthetic portion of the environment as an insert. As noted above, the sensor image is appropriately registered with the synthetic image by the decision unit 116. In other exemplary embodiments, characteristics of the image may be based on images collected by the EVS 114, which are then used to modify or improve the synthetic portions of the image generated by the SVS 112. In the depicted exemplary embodiment, the sensor image corresponds to landing information 250, as will be discussed in greater detail below.

Figure 3:
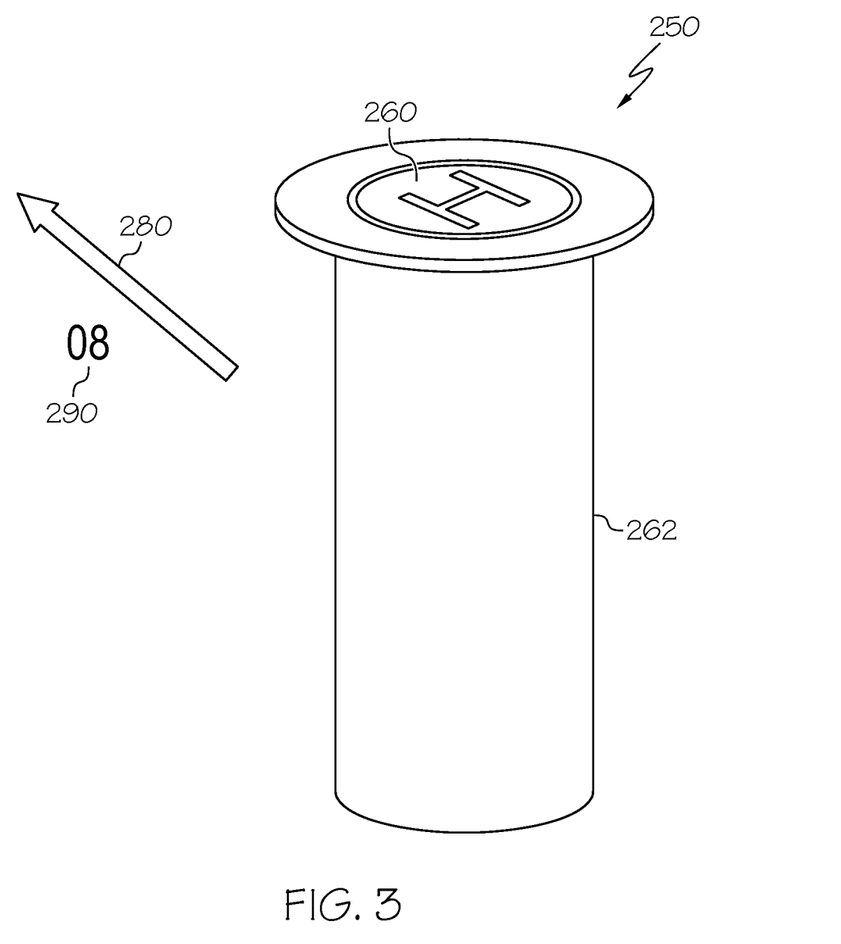
FIG. 3 is a more detailed portion of the visual display of FIG. 2 in accordance with an exemplary embodiment.

FIG. 3 is a closer view of the landing information 250 from FIG. 2. As described below, the landing information 250 may include various aspects and characteristics to assist the operator with landing on a moving or movable platform.

In one exemplary embodiment, the landing information 250 may include symbology for the landing platform 260 that accurately represents the actual landing platform on the individual carrier, including any applicable marking or shapes. As such, in the depicted embodiment, the landing platform 260 is a conformal, circular shaped landing pad, although other shapes and configurations can be provided. As also shown, symbology representing the landing platform 260 also includes markings in the form of an "H" symbol, which in this situation indicates that the landing platform 260 is intended for helicopters and provides a reference for alignment or orientation. As appropriate, additional lighting or markings corresponding to the touchdown and liftoff area (TLOF) and/or final approach and takeoff area (FATO) may be represented. As noted above and discussed in greater detail below, this information may be based on data collected by sensors 150. As such, the landing information 250, including the landing platform 260, is presented in a manner that is specific to the individual carrier. This is beneficial considering that characteristics of landing platforms vary from carrier to carrier. In other embodiments, the landing platform 260 may be more generic symbology.

In the scenario of FIG. 3, the platform 260 is presented as being located on a pedestal 262 and may represent the carrier. The pedestal 262 may assist the operator in recognizing the platform 260 on the display 200. In one exemplary embodiment, the pedestal 262 has a height relative to the terrain surface that accurately represents the relative height of platform 260 relative to the terrain surface. In one exemplary embodiment, the height of the pedestal 262 may represent the height relative to the carrier surface, although in the depicted embodiment, the height of the pedestal 262 represents the height relative to the ground or water surface. The width of the pedestal 262 relative to the platform 260 may vary, e.g., as a function of distance. In some exemplary embodiments, the landing information may be maintained as displayed in FIG. 3 with the platform 260 and pedestal 262 as the aircraft lands, while in further embodiments, the pedestal 262 may be replaced or modified with additional and/or alternative carrier symbology as the aircraft approaches the carrier.

The landing information 250 further includes symbology representing the energy parameters of the carrier, and particularly, that the landing platform is moving or movable. In the depicted embodiment, the movement (or energy parameters) symbology includes an arrow 280 representing the direction of movement of the carrier and a magnitude of the speed 290 ("08" in the depicted example) of the carrier, and thus, the platform 250. In one exemplary embodiment, the direction arrow 280 and speed 290 are provided in a form that indicates the motion of the carrier relative to the motion of the aircraft. In other exemplary embodiments, the speed 290 may be provided in absolute terms. Generally, the movement symbology is presented immediately adjacent to or otherwise superimposed on the landing platform 260 such that the information may be immediately evaluated and considered by the user in a manner than minimizes attention diversion.

Figure 4:
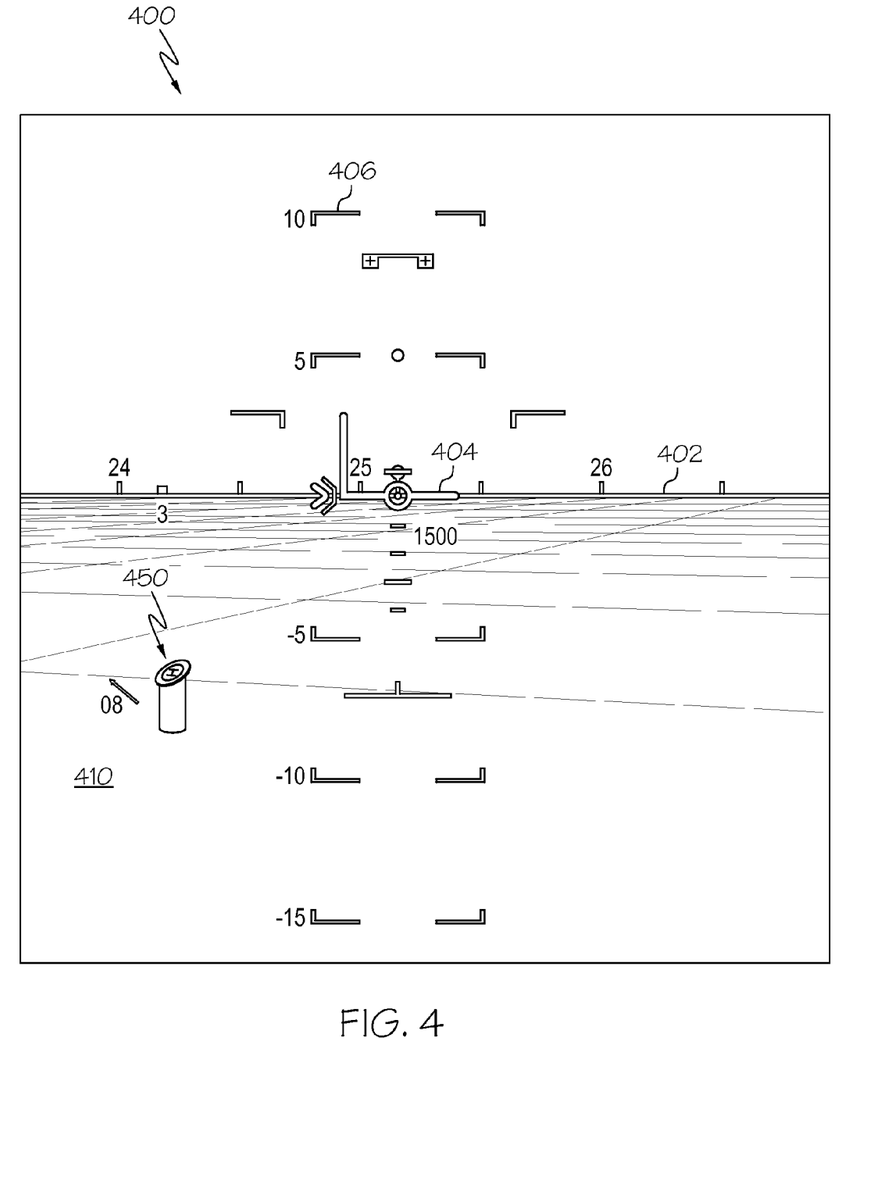
FIG. 4 is another visual display rendered by the aircraft display system of FIG. 1 in accordance with an exemplary embodiment.
Figure 5:
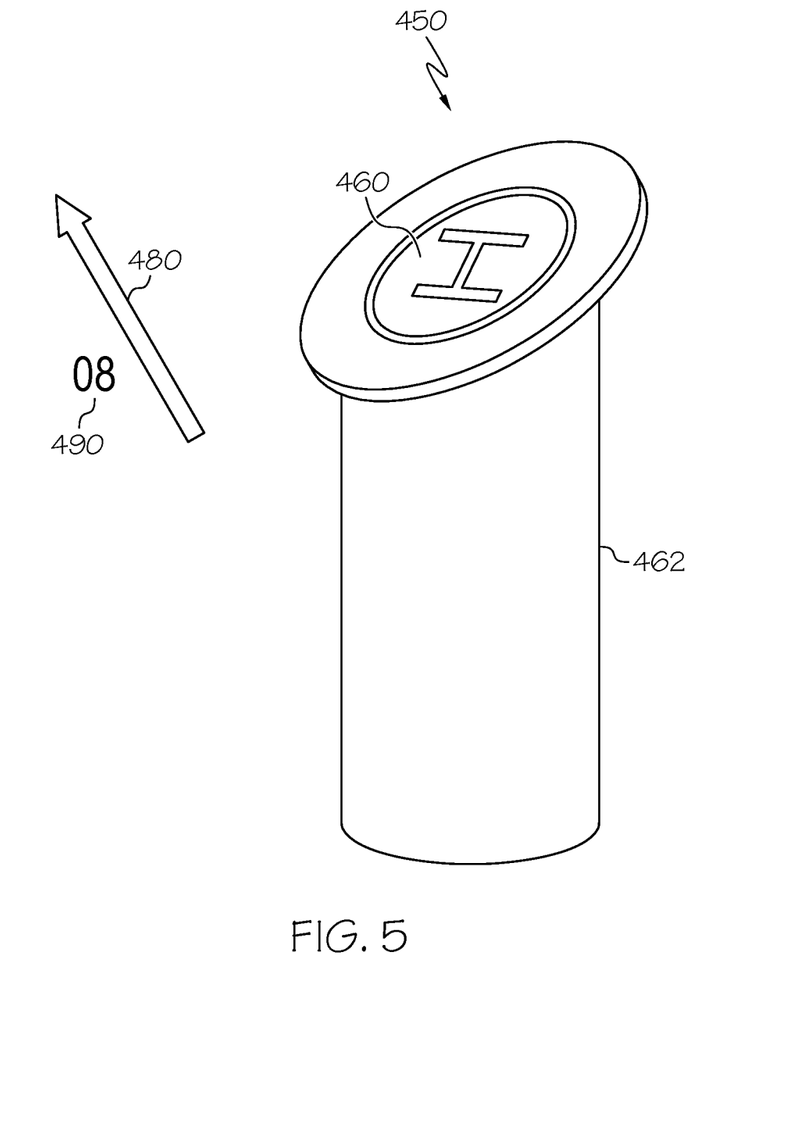
FIG. 5 is a more detailed portion of the visual display of FIG. 4 in accordance with an exemplary embodiment.

FIG. 4 is a further exemplary visual display 400 that may be rendered by the aircraft system 100 of FIG. 1 in accordance with an exemplary embodiment. The display 400 of FIG. 4 is similar to the three-dimensional synthetic perspective view of the type shown in FIG. 2 and depicts landing symbology 450 representing a target landing environment. As above, the display 400 shows, among other things, computer generated symbols representing a zero pitch reference line 402, a flight path marker 404, attitude indicator 406, and terrain 410. A more detailed view of the landing symbology 450 is depicted in FIG. 5. As shown in FIG. 5, the landing symbology 450 includes a landing platform 460 on a pedestal 462 and movement symbology in the form of a directional arrow 480 and speed 490.

As shown in this exemplary embodiment, the landing symbology 450 may be presented in a manner that also represents the roll and pitch of the carrier and landing platform 460. In particular, the three-dimensional orientation of the platform 460 may provide an intuitive representation of the nature and magnitude of the pitch and roll.

In accordance with an exemplary embodiment, the system 100 may consider the safety margins of the carrier and/or the aircraft during the landing situation when displaying the landing symbology 450. For example, in the situation of FIG. 5, the pitch and roll have relatively high magnitudes, as indicated by the attitude symbology, and may unsuitable for continuing the landing operation. In such a scenario, the landing symbology 450 may include a warning, such as a change in color of the landing platform 460 (e.g., from a neutral color to a warning color, such as yellow or red). Other alerts may be provided, including other types of visual alerts and/or audio alerts.

To generate these warnings, the system 100 may consider the current or predicted energy profile of the carrier and the current or predicted energy profile of the aircraft as relative or absolute parameters. These energy parameters may be compared to applicable safety margins or guidance, and if the energy parameters exceed the margins, the system 100 generates the suitable warning. The safety margins may be determined from any suitable source and stored in database 120, as an example. In one exemplary embodiment, the safety margins may be provided by a government or industry group or the carrier itself that, as an example, details the conditions (e.g., wind speed, wind direction, pitch, roll) that are acceptable for a particular type or model of aircraft to safely land. Other or additional pitch and roll symbology may be provided. The pitch symbology may further have dynamic properties to represent changes to the current pitch.

As a result of the exemplary embodiments discussed above, the energy parameters of the landing platform and carrier may be presented to the operator. In the scenarios presented above, the high seas may cause varying motion of the carrier, which when happen in tandem with low visibility would otherwise degrade the visual cues of the operator. However, the displays 200, 400 enable the operator to adjust the position of the aircraft dynamically according to the carrier movement as the aircraft approaches the carrier. The data collected by the sensors 150, typically used in the EVS 114, enables the system 100 to track and evaluate the moving platform for display on the primary flight display. As a result, exemplary embodiments enable the evaluation, display and consideration of energy parameters of the landing platform (including pitch and roll) to provide a more accurate representation of the landing environment. Conventional displays only represent the pitch and roll of the aircraft, even though the landing platform may be undergoing pitch and roll independently of the aircraft. Exemplary embodiments provide consider the energy parameters of both the aircraft and the carrier of the landing platform.

Figure 6:
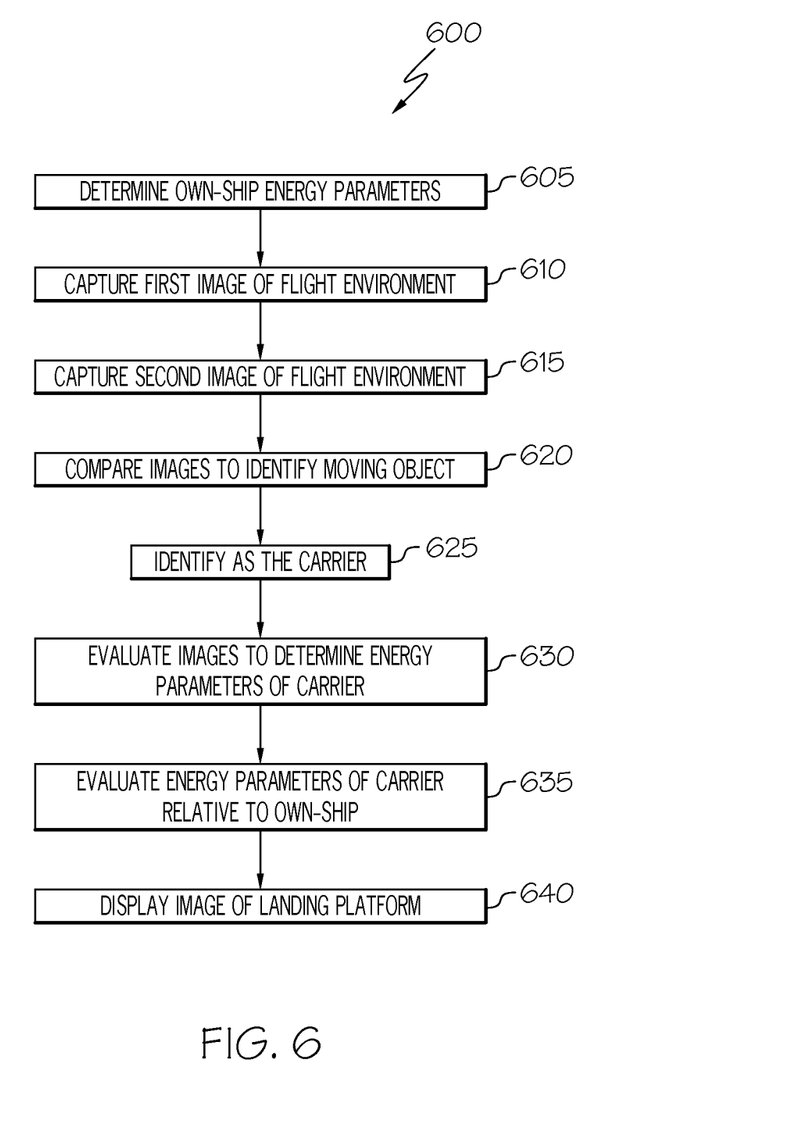
FIG. 6 is a flowchart of a method for displaying a landing platform in accordance with an exemplary embodiment.

Additional aspects regarding the operation of the system 100 and the visual displays 200, 400 are discussed below in the description of the method of FIG. 6. FIG. 6 is flowchart of a method 600 for displaying the landing environment in accordance with an exemplary embodiment. The method 600 of FIG. 6 may be used to render the visual displays 200, 400 with the system 100, and as such, FIGS. 1-5 may be additionally referenced below in the discussion of FIG. 6. It should be appreciated that method 600 may include any number of additional or alternative tasks, and the tasks shown in FIG. 6 need not be performed in the illustrated order.

As noted above, the method 600 is generally implemented in a flight environment, typically as the aircraft prepares to land. The method 600 may be automated such that, upon reaching a predetermined distance from the landing location, the method 600 is initiated. In another embodiment, the method 600 may be manually initiated by the aircraft operator.

In a first step 605 of the method 600, the system 100 is configured to determine the own-ship energy parameters, including the location, altitude, attitude, and speed, as well as intended energy parameters. This information may be provided, for example, by the flight management system 140 and navigation system 130.

In a second step 610, the system 100 may capture a first image of the flight environment, and in a third step 615, the system 100 may capture a second image of the flight environment as a subsequent point in time to the first image. In one exemplary embodiment, these images may be captured by sensors 150, such as an infrared camera or millimeter wave radar that may be used as part of the EVS 114. As noted above, the sensors 150 may include, e.g., weather penetrating sensors, that provide images of an external scene at a video frame rate.

In step 620, the first and second images are compared to identify a moving object. In step 625, the moving object may be identified as the carrier. In many flight environments, the carrier associated with the landing location may be the only moving object, and thus, may be identified as the carrier using image subtraction and/or optical flow estimation techniques. In other embodiments, other steps may be implemented to confirm and/or identify the carrier. In further embodiments, the landing platform on the carrier is additionally identified. In alternate embodiments, other types of sensor data may be collected to identify the carrier and platform. For example, image recognition technology that forms part of the SVS 112 or EVS 114 may be used to identify the landing location.

In step 630, the first and second images are evaluated to determine the energy parameters of the carrier, for example, analyzing multiple image frames. In some exemplary embodiments, additional data may be collected to determine the energy parameters. In one exemplary embodiment, the energy parameters determined in step 630 may include the heading, speed, pitch, and roll of the carrier. In some embodiments, other cues that may be detected and used to determine the movement of the carrier and landing platform include helicopter landing direction lighting aids, helideck perimeter lights or helideck edge light flush, helideck homing beacon. In step 635, the energy parameters of the carrier are evaluated relative to the energy parameters of the own-ship to determine relative energy parameters.

In step 640, information regarding the landing platform and carrier is presented to the operator. Such information may include a visual depiction of the landing platform and the relative energy parameters, such as the type discussed above with reference to displays 200, 400 of FIGS. 2-5. The rendering of the landing platform may be augmented with additional graphics or text information. As a result, in some embodiments, no specialized sensors are required to measure the carrier energy parameters since such information may be provided by the sensors (e.g., EVS sensors) onboard the aircraft. Similarly, in some embodiments, no specialized communication equipment on the carrier is necessary.

Accordingly, the enhanced display of the landing information can provide important information in a more convenient position for the pilot for easy recognition and evaluation. As such, during an approach and/or landing operation, the pilot can concentrate on the landing information without detracting attention from the navigation and control. This can reduce pilot workload and navigation and control errors, improve performance consistency, and increase flight safety. Warnings, including the use of colors and other type of alerts, may be provided to further enhance pilot awareness. The exemplary embodiments discussed above are particular useful in landing on a carrier in an ocean environment, which may otherwise provide challenging operating conditions with respect to wind and wake turbulence during landing and takeoff Based on this information, the pilot knows the appearance, type, and lateral position of the target landing environment. This enables the pilot to perform the referencing task during a landing operation more quickly and accurately.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for an aircraft, comprising:
   a sensor positioned on the aircraft and configured to capture data associated with a landing platform on a movable carrier external to the aircraft, the data including current energy parameters of the movable carrier;
   a processing unit configured to receive the data associated with the landing platform, the processing unit further configured to generate display commands associated with the landing platform; and
   a display device onboard the aircraft and coupled the processing unit for receiving the display commands and operable to render first symbology representing the landing platform,
   wherein the processing unit is further configured to generate display commands associated with the energy parameters of the movable carrier, and wherein the display device is further configured to render second symbology representing the energy parameters of the movable carrier,
   wherein the energy parameters include at least one of a current motion direction of the movable carrier or a current speed of the movable carrier relative to the aircraft, and
   wherein the second symbology includes at least one of an arrow oriented in the current motion direction of the movable carrier or a numerical value of the current speed of the movable carrier relative to the aircraft.

2. The display system of claim 1, wherein the energy parameters include the current motion direction of the movable carrier, and wherein the second symbology includes the arrow oriented in the current motion direction of the movable carrier.

3. The display system of claim 1, wherein the energy parameters include the current speed of the movable carrier relative to the aircraft, and wherein the second symbology includes the numerical value of the current speed of the movable carrier relative to the aircraft.

4. A display system for an aircraft, comprising:
   a sensor positioned on the aircraft and configured to capture data associated with a landing platform on a movable carrier external to the aircraft, the data including current energy parameters of the movable carrier;
   a processing unit configured to receive the data associated with the landing platform, the processing unit further configured to generate display commands associated with the landing platform; and
   a display device onboard the aircraft and coupled the processing unit for receiving the display commands and operable to render first symbology representing the landing platform,
   wherein the processing unit is further configured to generate display commands associated with the energy parameters of the movable carrier, and wherein the display device is further configured to render second symbology representing the energy parameters of the movable carrier, and
   wherein the energy parameters include a current pitch and roll of the movable carrier relative to the aircraft, and wherein the landing platform of the first symbology is oriented to represent the current pitch and roll of the movable carrier.

5. The display system of claim 1, wherein the display device is configured to render a three-dimensional synthetic view of a flight environment that includes the first symbology and the second symbology.

6. The display system of claim 1, wherein the display device is a primary flight display.

7. The display system of claim 1, wherein the processing unit is configured to evaluate the energy parameters and generate an alert when at least one of the energy parameters exceeds a predetermined safety margin, and wherein the second symbology represents the alert.

8. The display system of claim 1, wherein the data further includes a height associated with the landing platform, and wherein the first symbology includes a pedestal supporting the landing platform to indicate the height associated with the landing platform.

9. The display system of claim 1, wherein the processing unit is configured to generate the display commands that represent a three-dimensional synthetic view of a flight environment, and wherein the display device is configured to render the first symbology as the image of the landing platform overlaying the three-dimensional synthetic view of the flight environment.

10. The display system of claim 1 wherein the sensor is configured to capture a first image of the movable carrier and a second image of the movable carrier as the data associated with the landing platform, and wherein the processing unit is configured to generate the display commands based on the first image and the second image.

11. The display system of claim 10, wherein the sensor includes at least one of an infrared camera or a millimeter wave camera.

12. A method for displaying a landing platform of a movable carrier with a display device on an aircraft, comprising the steps of:
    capturing data associated with the landing platform on the movable carrier external to the aircraft with a sensor positioned on the aircraft, the data including current energy parameters of the movable carrier;
    generating display commands associated with the landing platform; and
    rendering first symbology representing the landing platform on the display device based on the display commands, wherein the step of generating the display commands includes generating the display commands associated with the energy parameters of the movable carrier, wherein the step of rendering includes rendering second symbology representing the energy parameters of the movable carrier on the display device, and wherein the energy parameters include a current motion direction of the movable carrier, and wherein the step of rendering includes rendering the second symbology with an arrow oriented in the current motion direction of the movable carrier.

13. The method of claim 12, wherein the energy parameters further include a current speed of the movable carrier relative to the aircraft, and wherein the step of rendering further includes rendering the second symbology with a numerical value of the current speed of the movable carrier relative to the aircraft.

14. The method of claim 12, wherein the energy parameters further include a current pitch and roll of the movable carrier relative to the aircraft, and wherein the step of rendering further includes rendering the first symbology with an orientation representing the current pitch and roll of the movable carrier.

15. The method of claim 12, wherein the step of rendering includes rendering a three-dimensional synthetic view of a flight environment that includes the first symbology and the second symbology.

16. The method of claim 12, wherein the data further includes a height associated with the landing platform, and wherein the step of rendering includes rendering the first symbology with a pedestal supporting the landing platform to indicate the height associated with the landing platform.

17. The method of claim 12, wherein the capturing step includes capturing a first image of the movable carrier and a second image of the movable carrier as the data associated with the landing platform, and wherein the method further comprises identifying the energy parameters of the movable carrier from the first image and the second image.

* * * * *